United States Patent

[11] 3,567,901

[72] Inventors Harry T. Deininger, Jr.
  Willingboro, N.J.;
  Jay F. Whitsel, Southampton, Pa.
[21] Appl. No. 784,848
[22] Filed Dec. 18, 1968
[45] Patented Mar. 2, 1971
[73] Assignee The Budd Company
  Philadelphia, Pa.

[54] WELDING MONITOR SYSTEM USING PHOTOCELLS
10 Claims, 4 Drawing Figs.

[52] U.S. Cl. ................................................... 219/131,
  250/209, 250/217, 219/109
[51] Int. Cl. .................................................... B23k 9/00
[50] Field of Search ........................................ 219/109,
  110, 111, 131; 250/219 (DF), 209, 202, 219 (LG),
  219 (WD), 219 (S), 217; 356/171, 238; 228/8, 9

[56] References Cited
UNITED STATES PATENTS

| | | | |
|---|---|---|---|
| 2,939,963 | 6/1960 | Rideout .......................... | 250/219 |
| 3,370,151 | 2/1968 | Normando ..................... | 228/9 |
| 3,445,672 | 5/1969 | Marks ............................ | 250/219 |

Primary Examiner—Walter Stolwein
Attorneys—Thomas I. Davenport, Edward M. Farrell, Alford L. Trueax, Jr. and William R. Nolte ABSTRACT: Apparatus for detecting the presence or absence of an arc weld along a path of an article to be welded includes a plurality of photocells responsive to light from the arc to generate output signals. A detector circuit is actuated by the output signals to indicate a complete or incomplete weld of the article.

INVENTORS
HARRY T. DEININGER, JR.
JAY F. WHITSEL

ATTORNEY

WELDING MONITOR SYSTEM USING PHOTOCELLS

Missing and incomplete welds in welded metal assemblies have created problems in manufacture. These problems often result from attempting to maintain production at relatively high speeds, employment of new workers, use of new fixture setups and the like.

It has been the practice to have inspectors physically examine the metal assemblies for acceptable welded assemblies and mark or separate the unacceptable assemblies for later repair. Attempts have been made to automatically inspect the welded parts by various means including electronic monitoring devices. While some automatic inspection systems and methods have been generally acceptable, many such systems have tended to interfere or hamper the efficient operation of the welder. One reason for this is that the physical location of the inspection equipment has tended to restrict the freedom of movement of the welding operator. Other automatic inspection systems have been unduly cumbersome and expensive for the job required.

It is an object of this invention to provide an improved system for monitoring an arc welding operation to detect complete or incomplete welds on an assembly.

It is a further object of this invention to provide an improved system for monitoring an arc welding operation along predetermined lengths of assemblies being welded to detect complete or incomplete welds in the assemblies.

It is still a further object of this invention to provide an improved system for monitoring an arc welding operation to detect complete or incomplete welds and wherein means are provided for counting the number of assemblies welded.

It is still a further object of this invention to provide an improved system for monitoring an arc weld operation to detect complete or incomplete welds and wherein means are provided for counting the number of assemblies having complete welds.

In accordance with the present invention, apparatus for detecting the presence or absence of an arc weld along a path of an assembly to be welded is provided. A plurality of photocells is disposed to be responsive to light from an arc developed along the path during a welding operation to produce output signals. The production of output signals by all or a predetermined minimum number of said photocells indicates that a weld of the article has been made in a particular area or joint. A detector circuit is responsive to the output signals to indicate a complete or incomplete weld of the assembly being welded.

Other objects and advantages of the present invention will be apparent and suggest themselves to those skilled in the art from a reading of the following specification and claims in conjunction with the accompanying drawing, in which:

In describing the present invention, it is assumed that it is desirable to monitor an arc weld along some predetermined length of an assembly being welded, with the assembly comprising two metal pieces to be welded together. If the arc weld is not developed at any area along the length being welded, the weld will be considered incomplete and generally unacceptable. If an arc is developed along the entire length, a complete though not necessarily an acceptable weld is indicated. The monitoring is done by detecting the light from an arc.

As is well-known in arc welding, a consumable electrode may be used in welding. A source of voltage is connected across the electrode and the assembly being welded. The voltage and current between the electrode and the part being welded produces an arc. The heat resulting from the current causes the parts of the assembly to be welded together.

Figure 1:
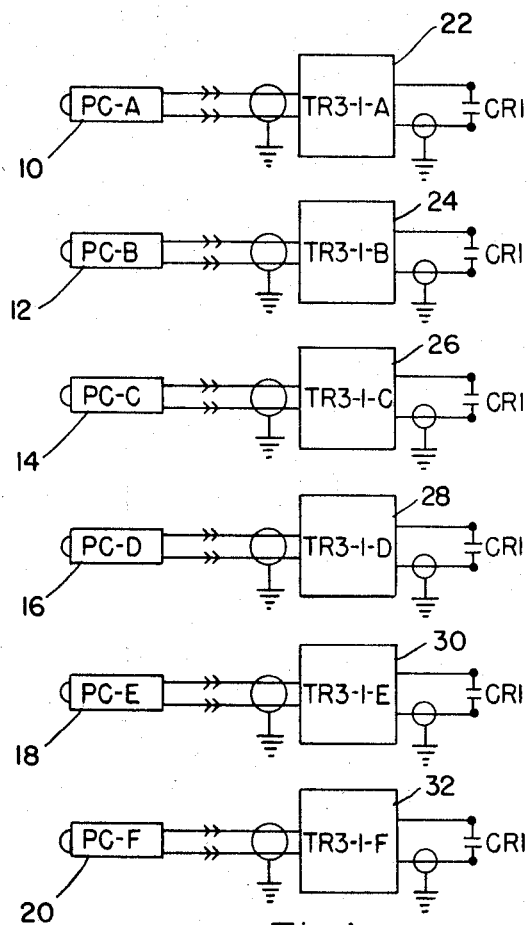
FIGS. 1 and 2 are schematic diagrams, partly in block diagram form, illustrating a welding system, in accordance with the present invention.

Referring particularly to FIG. 1, a plurality of photocells may be disposed above the assembly being welded to pick up the light produced by the arc during the welding operation. The photocells may be disposed above the operator and offset at an angle so as not to interfere with the freedom of movement of the welding operator. However, the photocells may be disposed at any convenient position which would enable monitoring of the welding operation without interfering with the operation. The photocell 10 may be disposed to pick up the arc near the end of the length of the arc. Photocells 12, 14, 16 and 18 are disposed to pick up the arc between the beginning and end of the arc length.

When light is detected by any of the photocells 10, 12, 14, 16, 18 or 20 and output signal is produced and applied to an associated one of the modules which may include relays 22, 24, 26, 28, 30 or 32. The circuit modules may include various logic, threshold level and other controls in addition to relays. Operation of the relays cause holding contacts designated CRI to close and maintain their associated relays closed. Other contacts, as will be described in connection with FIG. 2, are also actuated by the relays.

During operation, a welder passes the welding electrode over the metal assembly being welded. An arc is produced along the length of the weld. If an arc is produced at a particular area, one of the photocells 10 to 20 becomes responsive to the light produced by the arc. If no arc is produced at a particular area, the particular photocell associated with that area will remain nonresponsive and no output signal will be produced. The relay associated with the nonresponsive photocell will remain unactuated. Consequently the associated contacts of the unactuated relay remain open.

Figure 2:
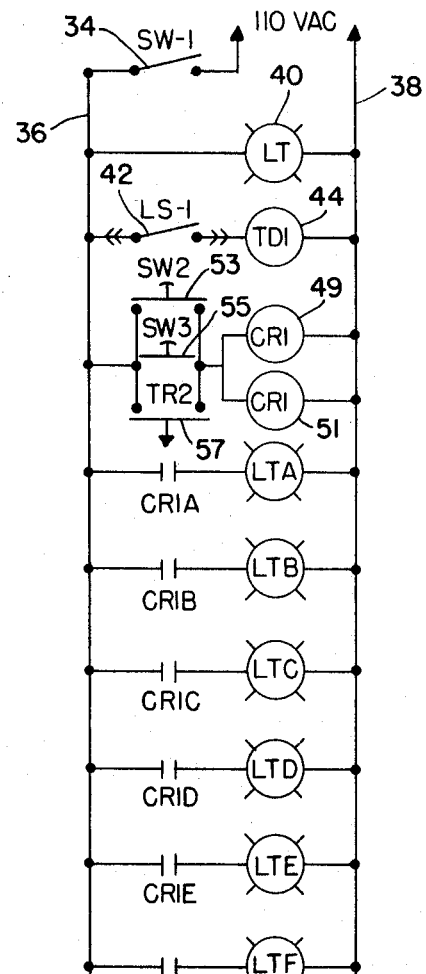
Figure 2:
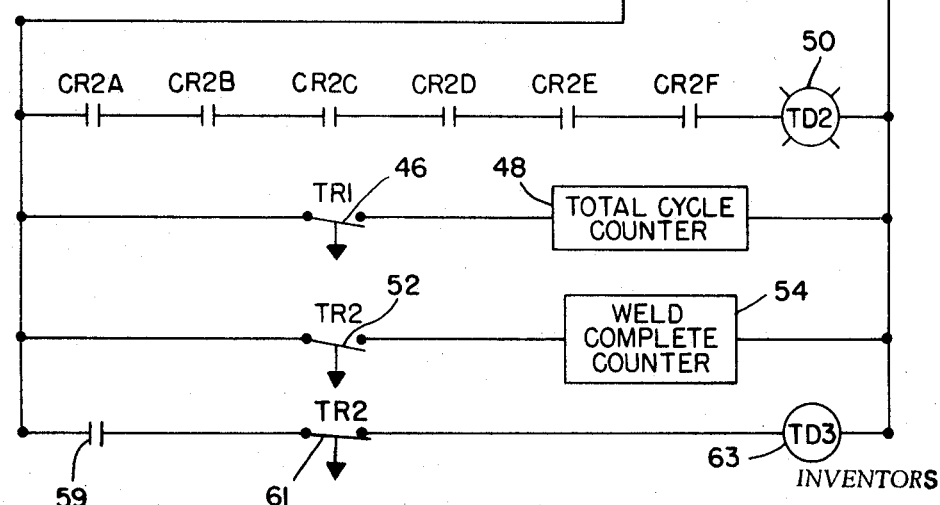

For purposes of clarity and easy cross reference from FIG. 1 to FIG. 2, the photocells and the relays are followed by designation letters A to F to indicate corresponding parts. The contacts indicated as CR are followed by letters A to F to correspond with the relays and photocells.

Referring particularly to FIG. 2, an electrical system for a welding operation monitoring system in accordance with the subject invention is illustrated. When a switch 34 is closed, a source of power which may be 110 volts AC is applied to lines 36 and 38 to operate a light 40. The system is now ready for operation.

A plurality of contacts designated CRIA to CRIF are closed whenever anyone of the associated relays 22 to 32 becomes actuated as a result of an arc being detected by one of the photocells 10 to 20. When any one of the pairs of contacts is actuated, a light associated therewith becomes operative. These lights are designated as LTA to LTGF. If any one of the lights do not light, it will indicate that an arc was not produced along a portion of the weld length. On the other hand, if all the lights become lit, it will indicate that an arc was picked up by the photocells through out the length of the weld or welds area.

Contacts designated CR2A to CR2F are connected in series with a relay 50. These contacts are also closed as a result of the actuation of the associated relays 22 to 32. In order for the relay 50 to become operative, all the contacts CR2A to CR2F must close. This would indicate that an arc was detected along the entire length of the welds being performed.

Operation of the relay 50 causes the switch 52 to close. When this happens, power is applied to the counter 54. The counter 54 indicates the number of complete welds which have been made on the assemblies being welded.

In most welding operations, it is necessary to move the assembly to be welded into a fixed position to enable an operator to perform the welding operation. A limit switch 42, which may be a microswitch or the like, is closed to operate a relay 44 whenever an assembly is moved into position. Operation of the relay 44 closes a switch 46 which operates a counter 48. The counter 48 counts the total number of assemblies which are moved into position to be welded.

Reset relays 49 and 51 may be actuated by the closing of any one of the switches 53, 55 or 57. The switch 53 may be located on a control unit, for example. The switch 55 may be conveniently disposed for the welding operator to operate. The switch 57 is closed each time a complete weld is performed and the relay 50 is operated. The resetting opens the contacts CR1 (FIG. 1). Also, contacts 59 in an alarm circuit are closed by the resetting operation as will be described.

A circuit for operating an alarm or operating a marking device may be used to indicate incomplete welds or to mark assemblies. This circuit may include normally open contacts 59, a normally closed switch 61 and a relay 63. The switch 61 is opened when the relay 50 is operated to indicate a complete weld.

Upon completion of an operation on an assembly, the contacts 59 are closed by a reset operation or other means. If the switch 61 is closed, it will indicate an incomplete weld. The relay 63 will therefore become operative to sound an alarm or to cause the assembly to be marked by a paint spray or other suitable means. Such alarms and markers are well known in the art.

Figure 3:
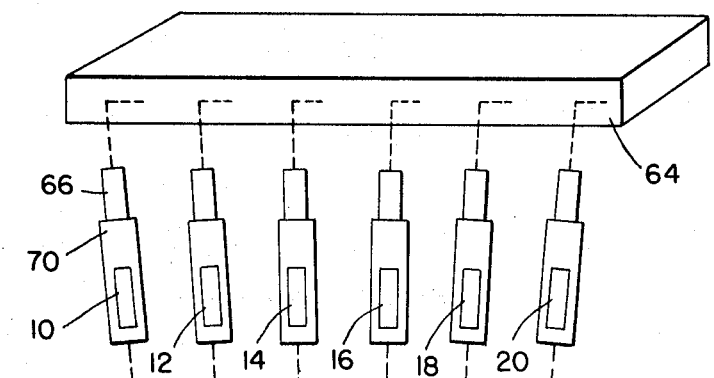
FIG. 3 represents the arrangement of photocell devices with respect to an assembly to be welded, in accordance with one embodiment of the present invention.
Figure 3:
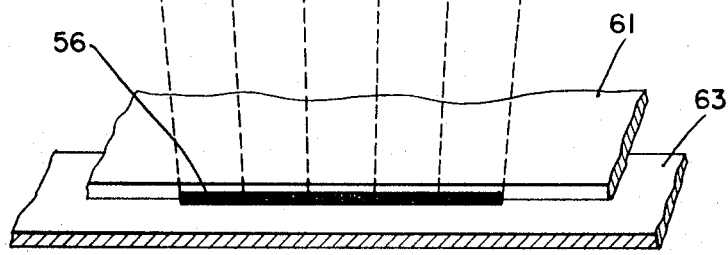

Referring particularly to FIG. 3, a plurality of photocells 10 to 20 are disposed within optical housings. The photocells with their housings are mounted on appropriate fixtures to detect light from an arc created along a length 56 of an assembly being welded. The light detected from the arc is directed through an optical arrangement to photocells, with the details of the optical arrangement to be described in connection with FIG. 4.

The photocells 10 to 20 detect light only from a relatively small area of the arc. In some cases, it is desirable to detect the arc from a point which is not the highest point of intensity of the light. A consideration in the design of the optical system may involve the use of threshold level circuits so that the relays associated with the photocells do not become actuated as a result of any light other than the light from the arc weld beam detected. For example, the system should be nonresponsive to normal daylight.

The assembly to be welded together may include two metal flat elements 61 and 63 which overlap one another. The weld is produced along the joint of the two elements with an arc being developed during the welding operation.

Figure 4:
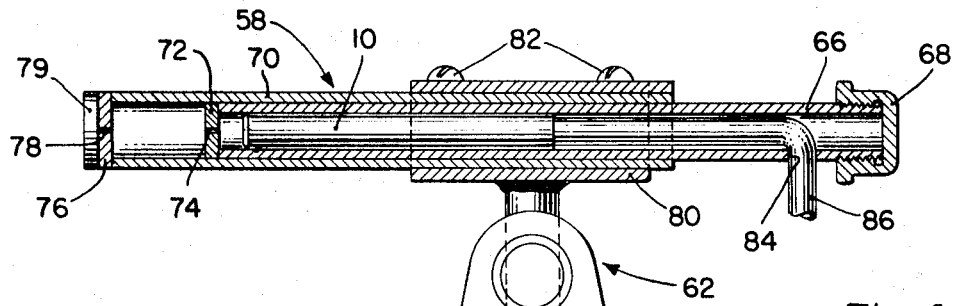
FIG. 4 illustrates an optical system which may be used with photocells in a welding operation, in accordance with the present invention.
Figure 4:
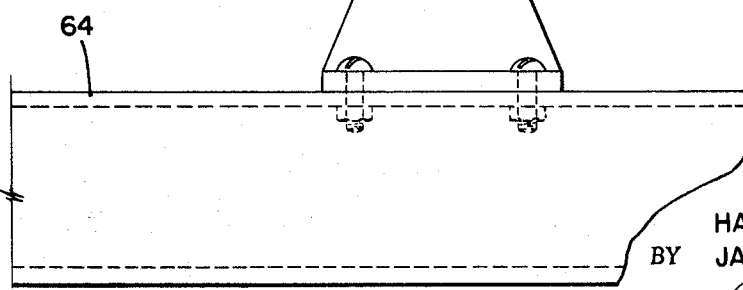

Referring particularly to FIG. 4, the optical assembly 58 includes a photocell 10. The optical assembly is suitably mounted to a universal joint 62 which permits the assembly to be moved at different angles. The universal joint 62 is mounted onto the fixture 64. The details relating to the universal joint 62 are not illustrated in detail since such elements are well known to those skilled in the art. Its primary purpose is to permit the optical assembly 58 to be moved about at different angles so as to detect the arc from the precise area desired. In practical operation, once the desired angle is attained, the assembly is locked in place.

The optical assembly or focusing device 58 includes a tubular member 66 having a cap 68 mounted thereto to hold the photocell and its associated conductor wires therein. A second tubing 70 is disposed to slide over the tubing 66.

The tubing 66 includes a circular cap 72 having a small centrally disposed aperture 74 therein. The cap 72 may be glued or otherwise suitably mounted onto the open end of the tube 66. In like manner, the tube 70 includes a circular cap 76 suitably mounted to the open end of the tube 70, The element 76 also includes a centrally disposed circular aperture 78. A glass cap 79 may be provided to keep the aperture 78 free of dirt particles.

In operation, the optical system 58 is inserted into a holding member 80. The tubular member 70 is inserted and held in place within the holding member 80 by means of screws 82. The tubular member 66 within the tubular member 70 is adjusted to the desired distance. When the desired positions of the tubular members are reached, the screws 82 are tightened to maintain the tubular members 66 and 70 fixed with respect to each other.

In order to limit the area of response of the optical system described, it is arranged so that light will be received from the arc and delivered to the photocells only from a small area of the arc. This area is determined by the distance between the caps 72 and 76, the distance between the assembly to be welded and the photocells as well as other factors.

When light is received from the arc being monitored, it passes through the small apertures 78 and 74 to the photocell 10. It is seen that while the aperture 78 may actually receive a relatively wide angle of light, only a small portion of the light will pass through the aperture of 74 to the photocell. The optical system 58 may be considered as a form of focusing device.

While the size and shapes of the elements illustrated may take a wide variety of forms in one practical embodiment, the tube 70 was made approximately 6 inches long and the tube 66 was made approximately 7 inches long. The outer diameter of the tube 70 was approximately eleven-sixteenths of an inch with the diameter of the tube 66 being approximately one-half of an inch. The member 76 had a diameter of eleven-sixteenths of an inch to correspond with the tube 70. This element 76 had a thickness of approximately one-eighth of an inch with the aperture being .020 inch. The metallic member 72 had a diameter of one-half of an inch and was approximately one-eighth of an inch thick. The aperture in this case was also .020 inch.

The tube 66 may include a slot 84 to permit the cable 86 from the photocell 60 to be connected to a utilization device such as a logic module previously mentioned, which includes a relay to be actuated.

While the subject invention has been described in terms of mechanical relays and contacts, it is apparent that solid state switching devices could be employed to accomplish the same purposes. Integrated circuits may also be employed in place of the elements illustrated without departing from the scope of the present invention.

The arrangement involving the photocells may of course be varied without departing from the scope of the invention. For example, the operation of the photocells may be sequenced by a stepping switch or the like so that if one photocell is missed, none of the subsequent photocells can be operative. In some cases, this arrangement may give a more positive indication of an incomplete weld.

Various recording devices may be employed to keep records relating to the number of assemblies welded, the number and identification of assemblies having incomplete welds etc. These recording devices may include magnetic tape, which may be adapted to feed the stored data into a computer for analysis or for record keeping.

It is noted that the present invention may be employed to detect the time it takes to make a weld. Consequently, the time taken by an operator may be compared with a standard. Also, the present invention, in addition to detecting a complete or incomplete weld, also is capable of detecting whether or not a weld was made along a certain path.

We claim:

1. Apparatus for detecting the presence or absence of an arc weld along a path of an assembly to be welded by a welding gun comprising a plurality of photocells responsive to light from an arc developed along said path to produce output signals, said plurality of photocells being maintained in fixed relationship to said assembly and said welding gun being movable with respect to said photocells and said assembly during operation the production of output signals by all of said photocells indicating a complete weld of said assembly, a plurality of switching circuits responsive to said output signals, a detector circuit responsive to said switching circuits to indicate a complete or incomplete weld of said assembly.

2. The invention as set forth in claim 1 wherein said plurality of switching circuits comprises a plurality of relays.

3. The invention as set forth in claim 2 wherein said detector circuit comprises one or more indicator light responsive to the operation of said relays.

4. The invention as set forth in claim 3 wherein said detector circuit further comprises a circuit for actuating a device whenever an incomplete weld is detected.

5. The invention as set forth in claim 4 wherein a focusing device is provided to limit the area of light from said weld which is applied to any one of said photocells.

6. The invention as set forth in claim 5 wherein said focusing device provides a housing for one of said photocells and comprises a pair of tubular elements disposed to be moved one within the other, with each of said tubular elements having an aperture therein to permit light to pass therethrough.

7. The invention as set forth in claim 6 wherein said plurality of photocells is disposed within a plurality of focusing devices.

8. The invention as set forth in claim 7 wherein said focusing devices with said photocells are adjustably mounted to a fixture to pick up light developed along the path of said assembly being welded.

9. The invention as set forth in claim 8 wherein a counter is provided to count the number of assemblies having complete welds.

10. The invention as set forth in claim 9 wherein a second counter is provided to count the total number of assemblies being welded.